United States Patent
Erickson

[11] 3,816,974
[45] June 18, 1974

[54] RELEASABLE STIRRUP
[75] Inventor: Leland E. Erickson, Milnor, N. Dak.
[73] Assignee: Triple J, Inc., Gwinner, N. Dak.
[22] Filed: Mar. 12, 1973
[21] Appl. No.: 340,542

[52] U.S. Cl. .................................................. 54/49
[51] Int. Cl. ............................................. B68c 3/00
[58] Field of Search .......................................... 54/49

[56] References Cited
UNITED STATES PATENTS
908,265  12/1908  Ivey ........................................ 54/49
942,781  12/1909  Johnston ................................ 54/49

Primary Examiner—Hugh R. Chamblee
Attorney, Agent, or Firm—Dorsey, Marquart, Windhorst, West & Halladay

[57] ABSTRACT

A releasable stirrup for a riding saddle. The stirrup is characterized by a forked upper member and a lower foot supporting member releasably attached to the upper member. If the rider falls or is thrown from the horse and a foot remains jammed in the stirrup, the lower member releases from the upper member to prevent dragging of the rider by the horse.

7 Claims, 4 Drawing Figures

PATENTED JUN 18 1974 3,816,974

3,816,974

RELEASABLE STIRRUP

BACKGROUND OF THE INVENTION

The invention pertains to the field of releasable safety stirrups for riding saddles. Such stirrups must provide secure support for the weight of the rider when in the saddle, remain intact when carrying no weight and when being bounced and whipped in unweighted condition, such as when the saddle is being mounted on the horse and when the horse runs with an empty saddle, and yet release when the rider is thrown or falls from the horse with a foot jammed in the stirrup. Such stirrups must also be capable of convenient and simple reassembly after release.

The prior art is replete with releasable safety stirrups. The problem of insuring that a fallen or thrown rider is not dragged by the horse has concerned inventors in large numbers since at least as early as the Civil War. The Fawcett patent (U.S. Pat. No. 51,708) granted on Dec. 26, 1865 is an early example of a prior art safety stirrup. The Korittke patent (U.S. Pat. No. 1,102,762) granted July 7, 1914 and the Stubblefield patent (U.S. Pat. No. 3,423,940) granted on Jan. 28, 1969 represent more recent examples of prior art in this field.

In general prior art safety stirrups are characterized by a fairly complicated linkage for maintaining the stirrup intact during use and allowing release when the rider falls or is thrown from the horse. Fawcett, for example, requires separate pivotal movement about two distinct transverse axes and release of a cross member from beneath a flange in order to disengage. In Fawcett dirt, rust or other material in the linkage may prevent operation as intended, thereby preventing release of the stirrup. The Korittke patent is also somewhat complicated and, relies on the retaining ability of side plates which, when sprung, release the lower stirrup member from the upper stirrup member. The Korittke patent releases as a result of pivotal movement of the lower stirrup member with respect to the upper stirrup member in either direction. Premature or undesired release is possible as the plates become worn. Stubblefield has the disadvantage of requiring a lower stirrup member in the form of a ribbon or strap having substantial width. This design rules out use in connection with "English type" stirrups such as that of the present invention. Moreover, axial force on the lower member may prevent a complete release of the stirrup.

SUMMARY OF THE INVENTION

The present invention has the advantage of being substantially less complicated in design thereby providing for a more pleasing appearance, less likelihood of malfunctioning, and ease and economy of construction. The invention consists of a releasable stirrup comprising a lower foot supporting member of convention design with a pair of horizontally spaced ear-like openings at its upper end, and a forked upper member having a pair of downwardly pointing legs with offset, shoulder-forming end portions extending through the respective openings. With the stirrup intact, the openings engage the shoulders. Hinge-like movement of the lower and upper members in one direction only results in release of the lower member from the upper member. The shoulder and offset end portions of the downwardly pointing legs of the upper forked member each have a longitudinal dimension sufficient to span the thickness of the lower stirrup member but not substantially longer. The elbow between the shoulder portion and the extreme end portion has an arcuate outside corner so that pivotal movement of the lower member results in passage of the ear-like openings from the offset end portion of the legs, thereby releasing the lower members from the upper member. The design locks the upper and lower stirrup members against hinge-like movement in one direction, and allows hinge-like pivotal movement leading to release in the opposite direction. With the stirrup weighted, secure support is provided. The downwardly pointing legs are slightly divergent so that, upon hinge-like movement of the lower stirrup member with respect to the upper stirrup member, force is required to move the legs toward one another to allow release. This feature prevents premature release when the stirrup is whipped around unweighted.

DESCRIPTION OF THE PREFERRED EMBODIMENT

Figure 1:
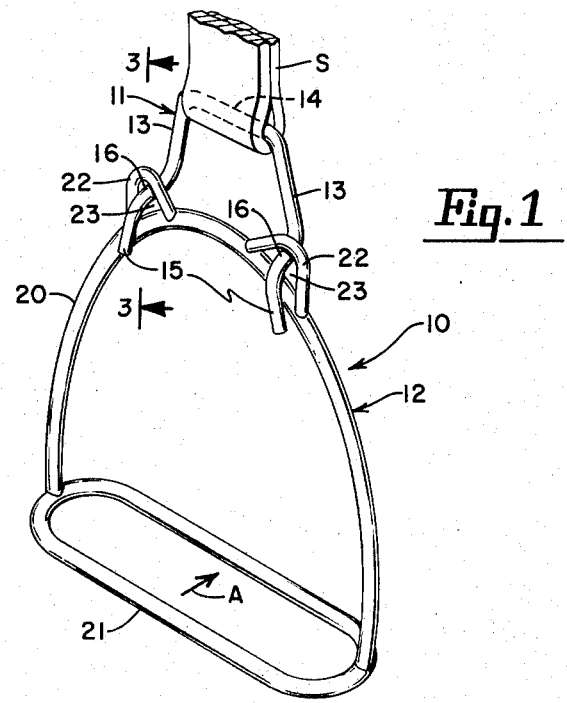
FIG. 1 is a perspective view of the releasable stirrup under normal conditions with the upper and lower members engaged or intact.
Figure 2:
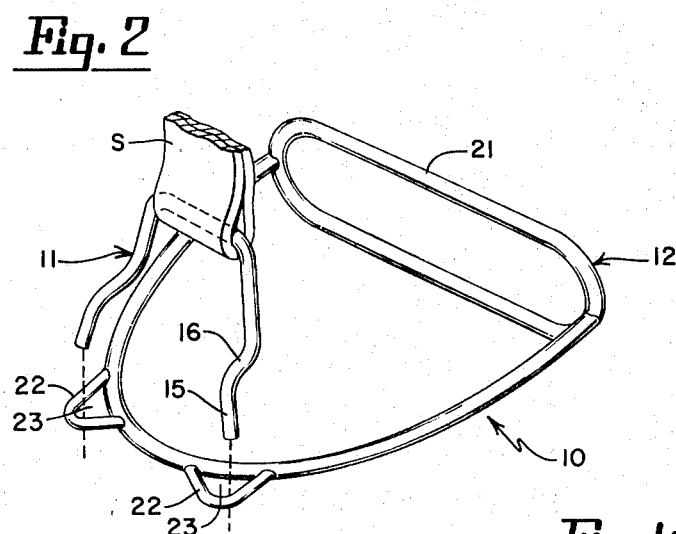
FIG. 2 is a perspective view of the releasable stirrup under conditions that result when the rider falls or is thrown from the horse with the lower member released or disengaged from the upper member.
Figure 4:
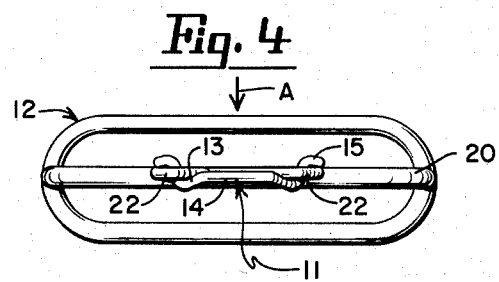
FIG. 4 is a top view of the stirrup in the engaged or intact position.

The safety stirrup 10 of the present invention is shown in the assembled in intact condition in FIG. 1. It includes a forked upper member 11 and a releasable lower foot supporting member 12. Upper member 11 is characterized by a pair of downwardly extending legs 13 which are slightly divergent, as best seen in FIGS. 1, 2 and 4. Upper member 11 includes an integrally formed cross member 14 which extends through looped saddle strap, S, thereby mounting the stirrup to the saddle (not shown). Legs 13 include integrally formed offset end portions 15 and shoulders 16.

Lower foot supporting member 12 includes a conventional arch member 20 and a double-edged, foot-supporting cross member 21 welded to and spanning the ends of arch member 20. Arch member 20 is, of course, of sufficient size to accommodate the rider's boot, the sole of which rests on foot-supporting, cross member 21. The specific configuration of the arch and cross members may vary widely depending upon the aesthetic stirrup style desired.

Figure 3:
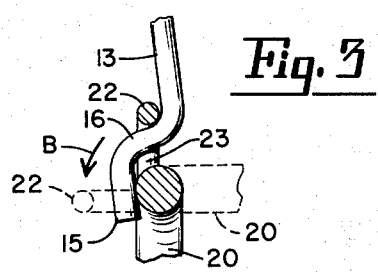
FIG. 3 is a sectional view taken on the line 3—3 of FIG. 1 and shows the shoulder-forming offset end portion of the upper member and its relationship with the lower member when the stirrup is intact. The relationship immediately prior to release is shown in dotted lines.

A pair of horizontally spaced ear-like members 22 are formed from wire loops welded to the upper or pinnacle area of arch member 20 and define openings 23. As best seen in FIGS. 3 and 4, ear-like members 22 are mounted to arch member 20 offset to one side, which results in improved alignment of the parts when assembled. In assembled relationship, as shown in FIG. 1, offset end portions 15 of legs 13 extend through openings 23, and ear-like members 22 rest upon shoulder 16.

Offset end portions 15 overlap the thickness of arch member 20 to retain lower member 12 in association with offset end portions 15 of legs 13 when in normal use.

As best seen in FIGS. 1, 2 and 4, legs 13 of upper forked member 11 are slightly divergent. The divergent configuration causes offset end portions 15 to slightly overlap the outside legs of ear-like members 22 when in the assembled or intact condition shown in FIGS. 1 and 4. In other words, the distance from outside edge to outside edge between offset end portions 15 of upper forked member 11 is greater than the maximum transverse dimension from one opening 23 to the other. This requires that legs 13 of upper forked member 11 be sprung together in order to pass into and from openings 23. This feature prevents premature release of the stirrup when being whipped around unweighted such as when the saddle is being mounted on the horse and when the horse is running with an empty saddle. It does not, however, prevent release when the rider is thrown or falls from the horse.

The operation of the present invention may be best understood with reference to FIGS. 1-3. The stirrup is mounted in the engaged or intact condition as shown in FIG. 1 with the offset end portions 15 extending toward the rear of the horse. Thus the toe of the rider's boot enters stirrup 10 from the near side as viewed in FIG. 1, or in the direction of arrow A shown in FIGS. 1 and 4. In other words, proper orientation of both the right and left stirrup, with respect to the horse, is shown in FIG. 1 if it is assumed that the front of the horse (not shown) is to the upper right. The foot of the rider is supported on cross member 21 with ear-like, wire-loop members 22 resting upon shoulders 16 of upper forked member 11. With lower member 12 in the natural vertical position of FIG. 1, ear-like members 22 are retained on shoulders 16 of legs 13 by offset end portions 15 which overlap arched member 20, preventing ear-like members 22 from slipping off shoulders 16 by rearward movement, and by the upper portion of legs 13, which prevent ear-like members 22 from from slipping off shoulders 16 by forward movement. Legs 13 and offset end portion 15 also prevent pivotal movement of upper member 11 with respect to lower member 12 in one direction while allowing pivotal movement (for release) in the other direction. Thus, under normal conditions of use stirrup 10 supports the rider's feet in the conventional manner.

If the rider falls or is thrown from the horse with a foot jammed or stuck in the stirrup, the natural result is to cause a pivotal or hinge-like movement of lower member 12 with respect to upper member 11 in the direction of arrow B shown in FIG. 3. With lower member 12 pivoted into the position shown in dotted lines in FIG. 3, continued tension on strap, S, causes upper fork member 11 to pull from lower member 12 as shown in FIG. 2. The angle between upper forked member 11 and lower member 12 at the instant of disengagement varies with the amount of tension on strap, S, and with the bending moment at the hinged joint between the members. Typically, the primary force causing disengagement is tension on strap, S, with a minimum of bending moment. Consequently, the angle of disengagement is customarily about 45 percent. In certain situations, with minimum tension and maximum bending moment, release may occur closer to 90 percent as shown in FIGS. 2 and 3. In any event, the stirrup releases and the fallen rider is safely separated from the horse.

Certain changes may be made in the preferred embodiment shown and described without departing from the scope of the invention. As indicated above, for example, the configuration of arch member 20 and cross member 21 may vary widely depending upon the style of stirrup desired. Also, the manner of defining openings 23 may vary. For example, openings 23 could be defined below arch member and they could be defined with widely varying structure not necessarily including wire loops welded to arch member 20. Other changes may also be made without departing from the scope of the invention which is defined by the following claims.

I claim as my invention:

1. A releasable stirrup comprising in combination:
 a lower foot supporting member including an arch member having a pair of horizontally spaced openings at the upper end thereof,
 a forked upper member having a pair of downwardly pointing legs with offset shoulder forming end portions which include a shoulder portion extending transversely to the legs and an end portion extending from the shoulder portion substantially parallel to the legs, said forked upper member extending through the respective openings for releasable attachment to the lower foot supporting member such that hinge like movement of the lower and upper members results in release of the lower member from the upper member.

2. The stirrup of claim 1 wherein the openings are formed of wire loops.

3. The stirrup of claim 2 wherein the length of the shoulder portion of each leg is substantially equal to the width of the stirrup arch member at the loops and the offset end portion extends downwardly from the shoulder a distance sufficient to overlap the arch member.

4. The stirrup of claim 3 wherein the forked upper member is formed from wire.

5. The stirrup of claim 4 wherein the forked upper member includes a horizontally extending cross portion formed integrally with the legs.

6. The stirrup of claim 5 wherein the legs diverge from the cross portion.

7. The stirrup of claim 6 wherein the wire loops are offset with respect to the arch member.

* * * * *